Dec. 1, 1964  R. R. LOVE  3,159,295
ROLL-BACK TRUCK BED
Filed Nov. 14, 1961  7 Sheets-Sheet 1

INVENTOR.
RICHARD R. LOVE
BY
ATTORNEYS.

Dec. 1, 1964  R. R. LOVE  3,159,295
ROLL-BACK TRUCK BED
Filed Nov. 14, 1961  7 Sheets-Sheet 2

INVENTOR.
RICHARD R. LOVE
BY Kenyon, Palmer, Stewart & Estabrook
ATTORNEYS.

Dec. 1, 1964  R. R. LOVE  3,159,295
ROLL-BACK TRUCK BED
Filed Nov. 14, 1961  7 Sheets-Sheet 3

INVENTOR.
RICHARD R. LOVE
BY
*Kenon, Palmer, Stewart*
*& Estabrook*
ATTORNEYS.

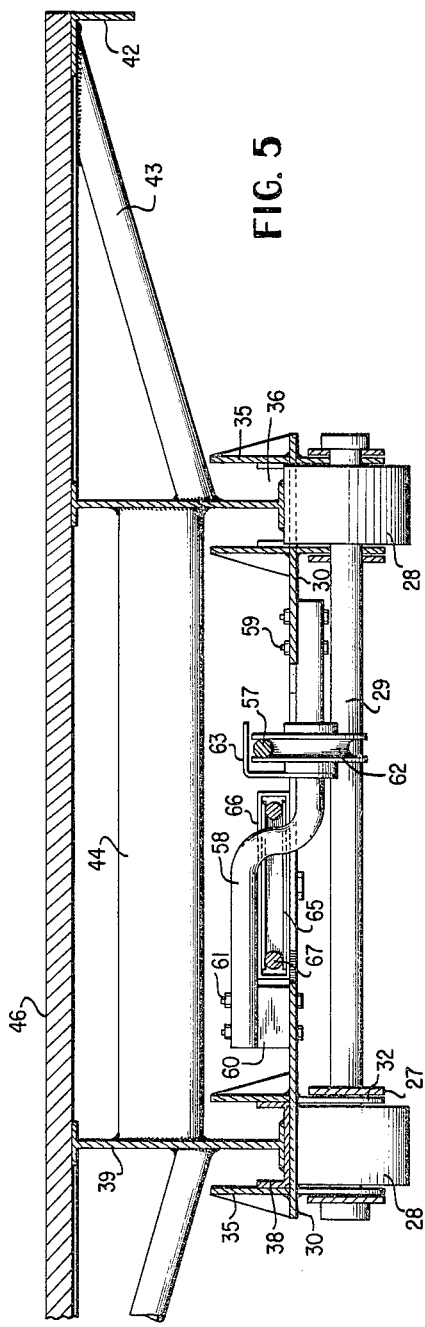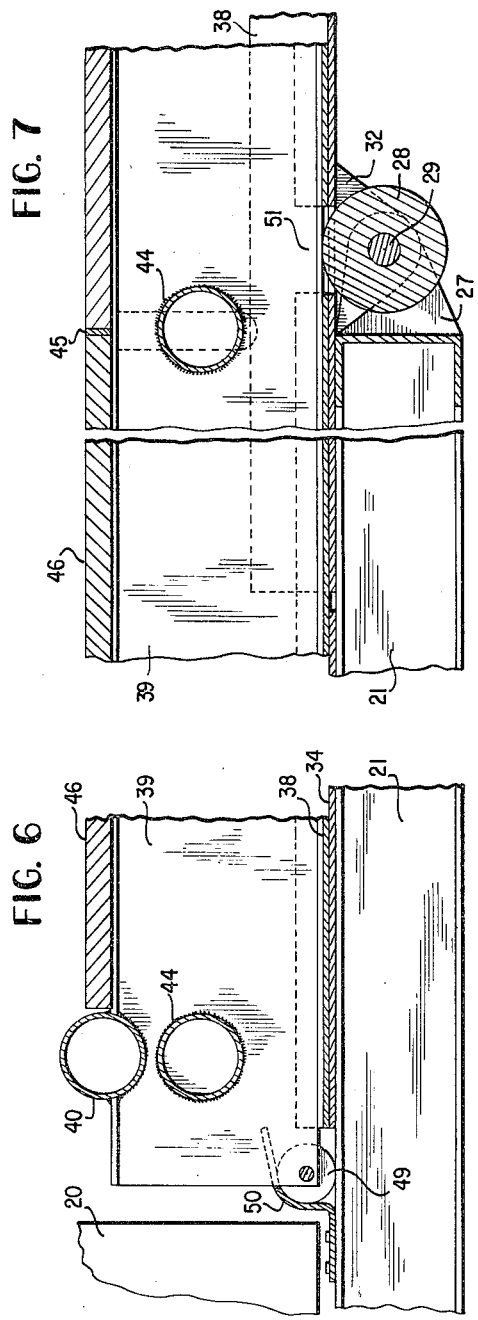

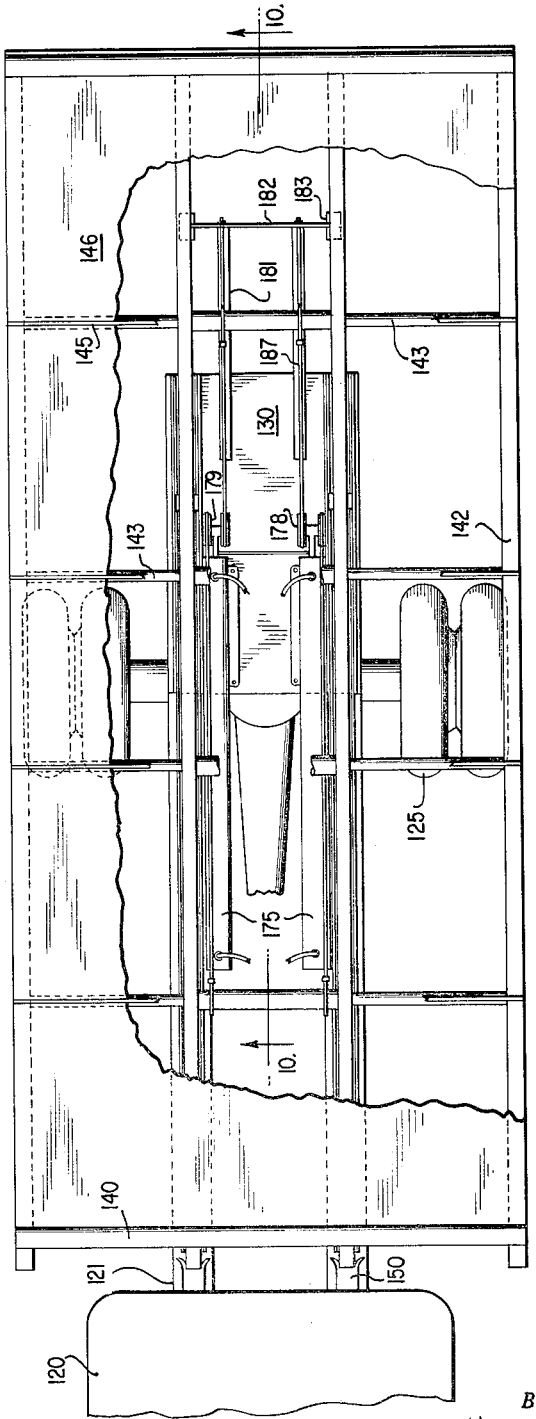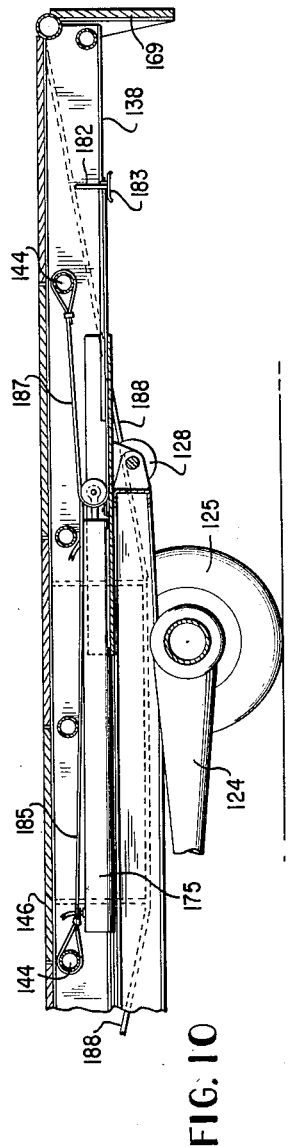

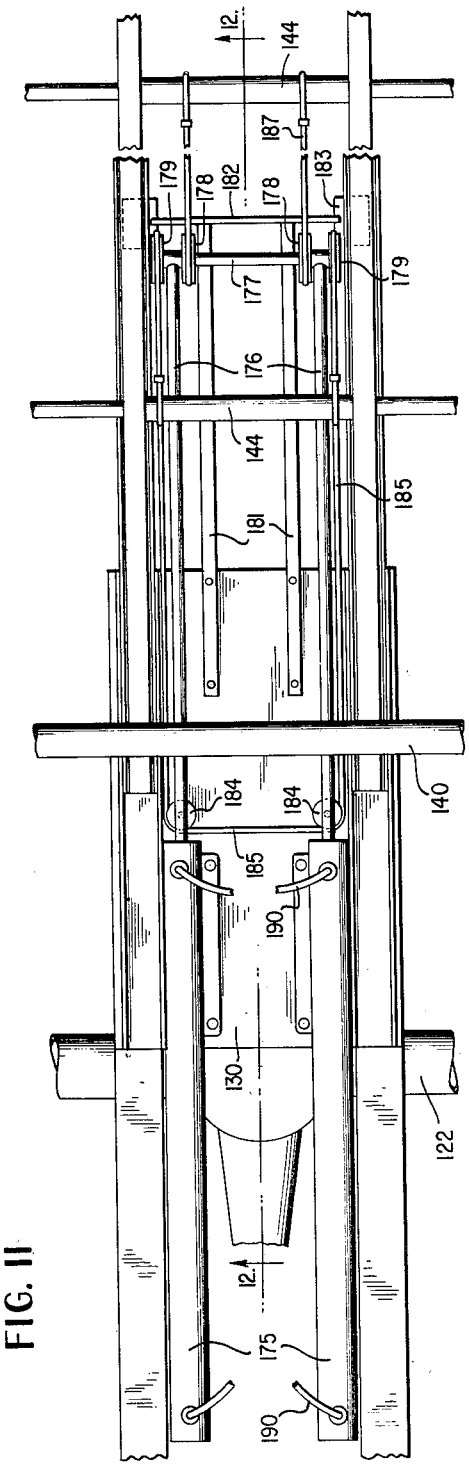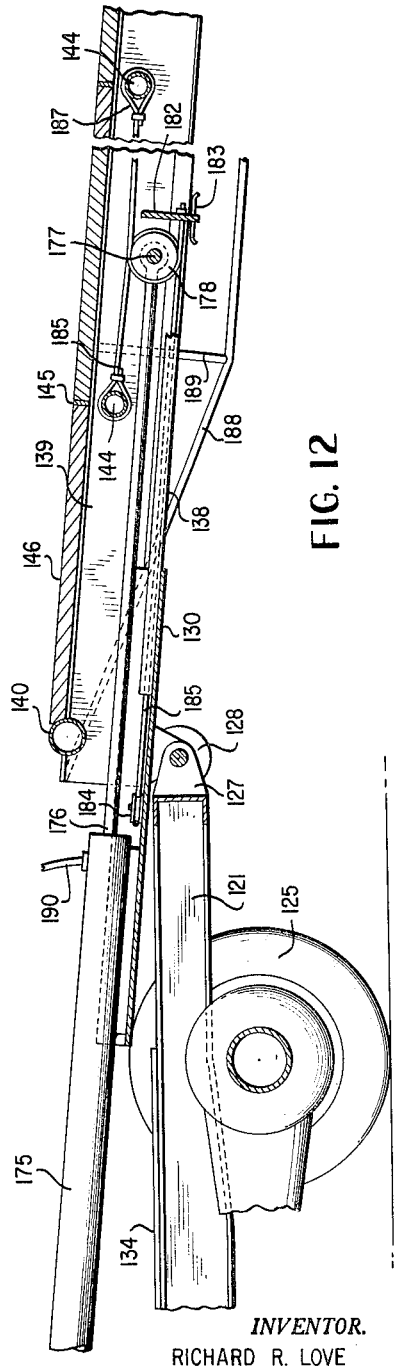

INVENTOR.
RICHARD R. LOVE
BY
ATTORNEYS.

United States Patent Office 3,159,295
Patented Dec. 1, 1964

1

3,159,295
ROLL-BACK TRUCK BED
Richard R. Love, Box 468, Buhl, Idaho
Filed Nov. 14, 1961, Ser. No. 152,236
10 Claims. (Cl. 214—517)

The present invention relates broadly to a vehicle of the truck type and more particularly to a mobile load-conveying platform provided therefor to facilitate the loading and unloading of various types of equipment.

Heretofore, trucks which have been employed for moving heavy construction equipment such as bulldozers, ditchers, excavating shovels and the like have been of generally two standard types. One of the more commonly employed types is a low-bed trailer wherein ramps are usually provided to move pieces of construction equipment onto the trailer from either the side or rear thereof. Another type is one having a bed or platform that is pivotally connected to the truck frame in the area of the rear axle housing to receive the piece of equipment as it is being driven thereon. In both instances, the truck or trailer usually has to be properly positioned to receive the piece of equipment as the inclination of the ramp is limited as well as the arcuate movement of the pivoted bed or platform and often times this can present a problem particularly where construction work is being conducted or the terrain is uneven.

In many instances, however, it is not always possible to properly position the truck so that ramps may be connected to the truck for properly loading a piece of equipment thereon. In situations of this type, the loading of the piece of equipment, such as a bulldozer, is often a hazardous operation as quite often the piece of equipment will slip or topple off the truck bed or ramp during the loading operation resulting not only in damage to the equipment but in bodily injury to the operator. While the use of a truck having a pivotally mounted platform, in lieu of a trailer with ramps, is, under certain conditions feasible and adequate, the angle at which the platform or bed is disposed with respect to the ground can present a rather hazardous path over which the piece of equipment must be moved. Thus, it becomes apparent that the most satisfactory method of loading a piece of construction equipment or any heavy equipment upon a truck would be through the use of a bed or platform that could be placed upon the ground rearwardly of the truck, then loaded and finally raised or elevated to a position upon the truck. In lieu of positioning a bed or platform upon the ground, an alternative arrangement would be in the use of a mobile bed or platform that could be moved on rollers along the truck frame to a position wherein it would project beyond the rear end of the truck and having one end supported on the truck frame and the other end on the ground at a very low angle of inclination.

The mobile platform or bed of the present invention is readily adaptable to the loading of a piece of heavy construction or farm equipment thereupon.

The platform or bed structure of the present invention is designed to be readily mounted or positioned upon a conventional truck frame and to be movable rearwardly off of said frame to a ground-engaging position to facilitate the loading or unloading of equipment from said platform. In one concept of the present invention, the bed or platform upon being lowered onto the ground permits the equipment or material to be readily loaded or removed from the rear or either of the sides. Such an arrangement makes for easy loading of any type of equipment upon the platform and particularly heavy construction equipment such as bulldozers, ditchers and the like. After loading, the platform or bed is then elevated and moved upon the truck frame to facilitate the carrying of said equipment from one location to another.

Another concept of the present invention consists in moving the bed or platform until it pivots about a point adjacent the rear end of the truck whereby the rear end of the platform will engage the ground and the forward end of the platform will be supported upon the truck frame. The positioning of the bed or platform in such a manner permits the equipment to be moved off of or upon the platform in a relatively easy manner due to the low angle of inclination of the platform with respect to the truck after which the platform in its loaded status is moved back onto the truck frame.

In both of the foregoing conceptions of the present invention, the truck is pulled back or moved rearwardly under the bed or platform to raise said bed or platform onto the truck frame and into a travelling position and in unloading the truck is moved or pushed forwardly out from under or beneath the platform and the equipment thereon.

One of the objects of the present invention is to provide a truck having a pivotally supported mobile platform wherein one end of the platform engages the ground as the truck is moved out from thereunder to facilitate the loading or unloading of said platform.

Another object is to provide a truck having a pivotally supported mobile platform with one end engaging the ground to facilitate loading or unloading prior to the truck being moved under the platform for raising same onto the truck.

Another object is to provide a truck having a mobile platform that is capable of being lowered to a ground-supporting position rearwardly of the truck for the loading or unloading thereof.

Another object is to provide a truck with a mobile platform that is capable of being moved off of and onto the rear end of said truck to facilitate the loading and unloading of the truck.

Another object is to provide a platform that is readily mountable upon a truck whereby said truck becomes a carrier having a platform which can be moved off of the truck into a ground-engaging position for the loading and unloading thereof.

A further object is to provide a truck having a mobile platform that is adapted to be rolled toward the rear of the truck until a certain portion of the platform or bed is projecting beyond the truck, whereupon said platform or bed pivots about the rear of the truck and is lowered into a ground-engaging position as the truck is moved out from beneath the platform to facilitate the placing of a load thereon.

Still further objects are to provide a mobile platform that is capable of being mounted upon a conventional truck frame with a minimum amount of change or modification of the truck, which is economical of manufacture and which platform is a complete assembly readily installable upon existing trucks.

Other objects and advantages, more or less ancillary to the foregoing in the manner in which all of the various objects are realized, will appear in the following description which, when considered in conjunction with the accompanying drawings, sets forth the preferred embodiment of the invention.

Referring to the drawings wherein the preferred embodiment of the invention is illustrated:

FIG. 5 is a vertical cross-sectional view showing a portion of the platform or bed mounted upon the truck frame, the view being taken on the plane 5—5 of FIG. 1;

FIG. 6 is a vertical sectional view showing a detailed portion of the bed or platform mounted upon the truck frame, the view being taken on the plane 6—6 of FIG. 1;

FIG. 7 is a vertical sectional view showing another detailed portion of the bed or platform mounted upon the truck frame, the view being taken on the plane 7—7 of FIG. 1;

FIG. 9 is a top plan view of a modification of the mobile platform or bed of the present invention with certain parts being broken away to more clearly illustrate the construction of other parts;

FIG. 10 is a longitudinal vertical sectional view of a portion of the modified truck and platform, the view being taken on the plane 10—10 of FIG. 9;

FIG. 11 is an enlarged detailed top plan view of a portion of the truck shown in FIG. 9 with the platform planking removed;

FIG. 12 is a longitudinal vertical sectional view showing a portion of the platform with planking extending rearwardly of the truck frame, the view being taken on the plane 12—12 of FIG. 11;

Figure 1:
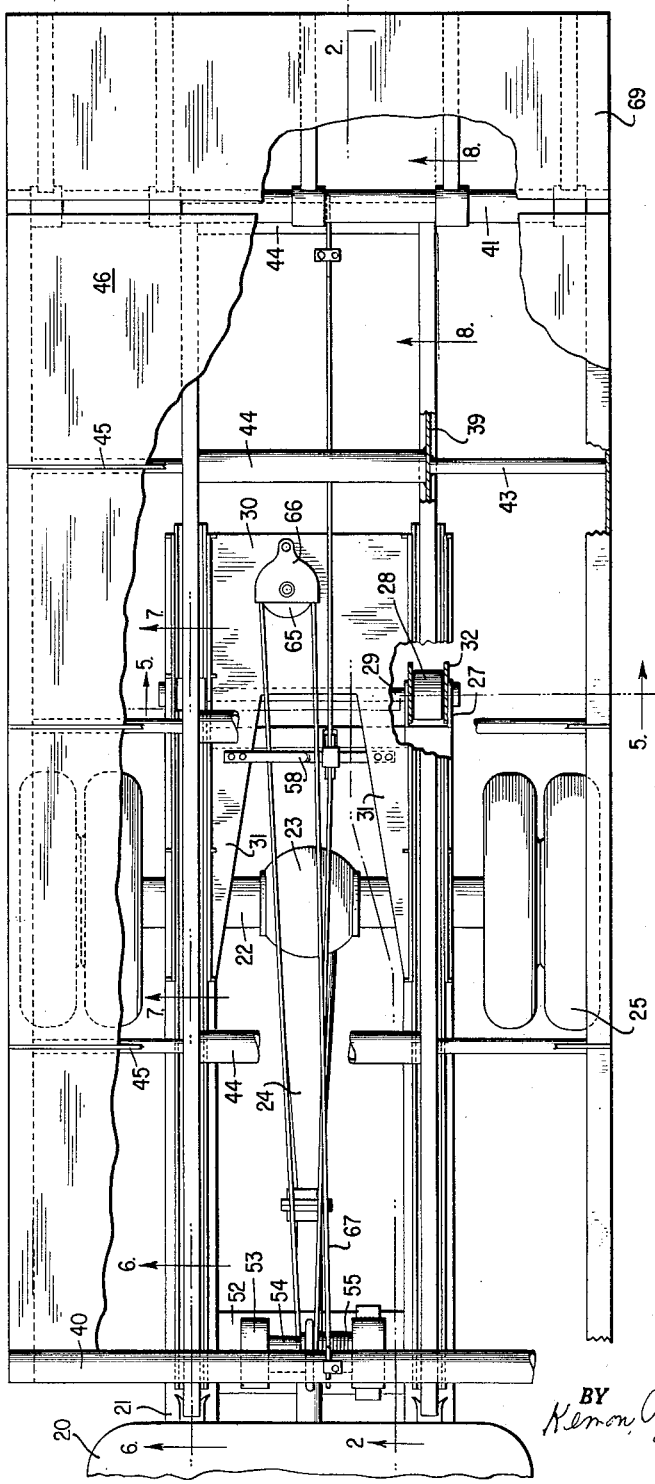
FIG. 1 is a top plan view illustrating the mobile platform or bed of the present invention with certain parts being broken away to more clearly illustrate the construction of other parts.
Figure 2:
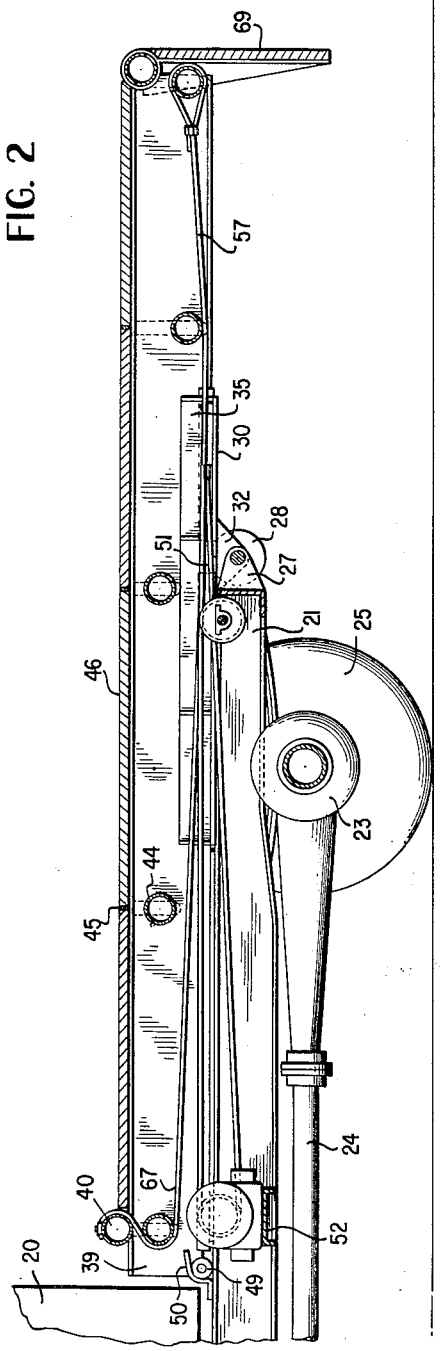
FIG. 2 is a longitudinal vertical sectional view showing the bed or platform mounted upon the truck frame, the view being taken on the plane 2—2 of FIG. 1.

Referring to the drawings, there is shown in FIGS. 1 and 2, portions of a conventional truck vehicle consisting of a driver's cab 20 that is mounted upon channel-shaped frame members 21 which are in turn supported by springs, not shown, upon a conventional axle housing 22. The axle housing 22 is provided with a differential unit 23 to which a drive shaft 24 is connected for driving the rear truck wheels 25 which are mounted in the customary manner upon the outer ends of the axle housing. The frame members 21 are each provided, at their rearmost end portions, with projections 27 which are extensions of the vertical side members of said channel-shaped frame members. The projections 27 of each frame member 21 have positioned therebetween a roller 28, which rollers are mounted upon a shaft 29 that extends transversely of the truck frame through suitable apertures provided in said projections. The rollers 28 are mounted on the shaft 29 upon suitable bearings, not shown, so as to have free rotative movement with respect thereto while positioned between the projections 27 of the respective frame members 21.

As shown in FIG. 1, the frame members 21 have positioned on the upper surface thereof, in overlying relation, a flat plate or member 30, which is formed with a bifurcated forward portion defining segments 31 that overlie said frame members and extend towards the forward or cab end of the truck. The plate or member 30 is formed, adjacent each side thereof, with pairs of depending legs or brackets 32 that are positioned between complementary pairs of projections 27 of the frame members 21. The brackets 32 are formed with aligned apertures for the reception of the shaft 29 so that the plate or member 30 is pivotally supported upon said shaft.

Figure 4:
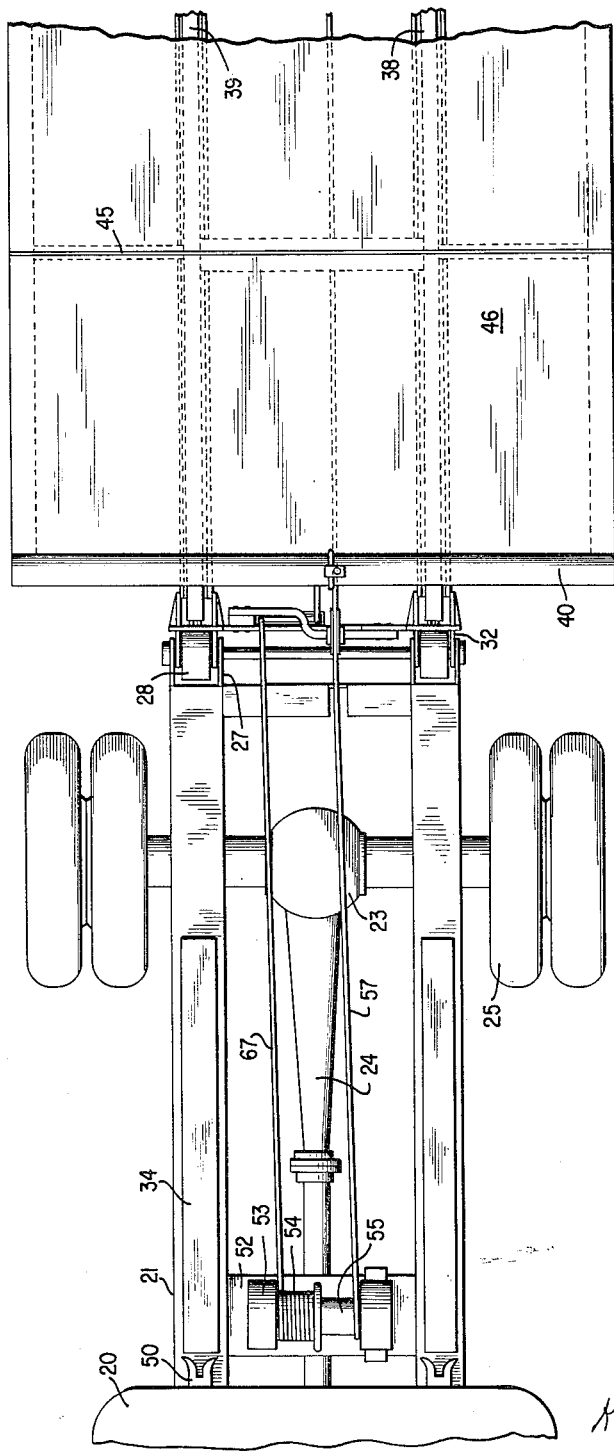
FIG. 4 is a top plan view showing a portion of the bed or platform in the load-receiving position as illustrated in FIG. 3.
Figure 8:
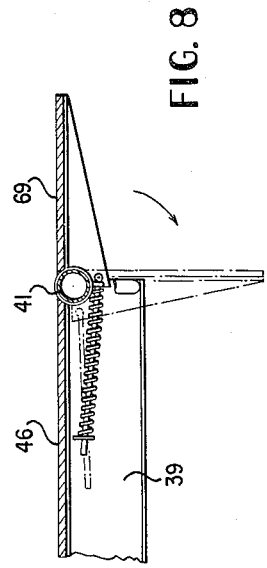
FIG. 8 is a vertical sectional view showing a detailed portion of the platform or bed, the view being taken on the plane 8—8 of FIG. 1.

The frame members 21 each have secured to the upper surface thereof in any suitable manner, plates 34 which constitute trackways, FIG. 4, which extend from the forward ends of the segments 31 to a point on said frame members adjacent the cab 20. The plates or trackways 34 are of the same thickness as the plate or member 30 so that the upper surfaces of the frame members 21 are provided with a uniform surface or trackway from the rearmost end portion of the truck to a point adjacent the cab 20. The member 30 is formed with suitable openings on each side thereof through which the rollers 28 project and whereby said plate or member 30 will be supported upon the frame members 21. The plate or member 30 has secured to the upper surface thereof, by any suitable means, vertically extending elongated angle bracket members 35. The angle members 35 are arranged in pairs in spaced parallel relation to one another and extending from the rear end of plate 30 to the forward edge of the segments 31 and constitute channel guideways 36 on said plate which are in aligned relation with the trackways 34.

The trackways 34 and channel guideways 36 on the member 30 having positioned thereon for movement with respect thereto channel members 38 which have secured thereto, by any suitable means, vertically extending stringer supports or eye beams 39 that extend throughout the entire lengths of said channel members 38. The stringers 39 have transversely extending tubes 40 and 41 secured to their forward and rear ends respectively, which tubes have affixed to the ends thereof angle brackets 42. The brackets 42 are arranged in spaced parallel relation to the stringers 39 and at spaced intervals angularly disposed tubular braces 43 have one end secured to the stringers 39 and the other end to the brackets 42. The stringers 39 are maintained in spaced parallel relation with one another by suitable braces 44 which have their ends secured in any suitable manner to adjacent sides of said stringers. The upper web or top surface of the stringers or eye beams 39 have tension bars 45 secured thereto at spaced intervals, which bars may overlie the braces 44 or be offset therefrom, so that a rigid structure is provided by means of the stringers 39, braces 43 and 44, tension bars 45 and angle brackets 42. The top or upper surface of the stringers 39 have suitable planking positioned thereon between the tubes 40 and 41 with the ends of the planking being supported by the brackets 42 so as to define a bed or platform 46.

The forward end of each of the stringers 39 projects slightly beyond the forward end of the corresponding channel members 38, and said forward end is provided with a roller 49 that engages a locking member 50 which is secured to the frame members 21 adjacent the cab 20 for the purpose of aiding in the retention and holding of the bed or platform upon said frame members. The channel members 38 are formed with suitable apertures 51 which are adapted to coincide with and overlie the rollers 28 so that when the bed or platform is fully positioned upon the frame members 21, the rollers 28 will project through the openings or apertures 51 and at the same time the rollers 49 will be in engagement with the locking members 50 whereby the channel members 38 will in effect be resting upon and be supported by the trackways 34 and the plate 30. Thus, when the bed or platform 46 is to be moved rearwardly or off of the frame members 21, the initial movement or force applied to said platform 46 will cause the channel members 38 to move up onto the rollers 28 and, at the same time, the rollers 49 will move away from the locking members 50 and up onto the trackways 34. The rollers 28 on the shaft 29 and the rollers 49 at the forward end of the stringers 39 tend to support the channel members 38 during the greater portion of the movement of the platform off of and onto the truck frame members 21.

The frame members 21 have secured therebetween, adjacent the cab 20, FIGS. 2 and 4, a transversely extending plate or platform 52 which has mounted thereon a conventional truck winch 53 that is formed with spool segments 54 and 55. The spool segments are adapted to have cables wound thereon, with a cable being wound upon one spool segment in a clockwise manner and a cable wound upon the other segment in a counterclockwise manner. The spool segment 55 has a cable 57 wound thereabout in a counterclockwise direction with one end of the cable being fastened to the rear end of the platform such as a brace 44. The segments 31 of the plate or member 30 have a bar 58 mounted thereon with one end of the bar 58 being secured to the lower or bottom face of one of the segments 31 by means of suitable bolts 59. The central portion of the bar 58 is formed with a double bend so that the other end of the bar is offset from the first end and arranged to overlie the upper surface of the other segment 31 of the members 30. A spacing block 60 is interposed between the last-mentioned end of the bar 58 and the top surface of one of the segments 31 while suitable bolts 61 secure said end of the bar and spacing block to the segment 31. The bar 58 has a free-running pulley 62 mounted thereon, intermediate the segments 31, and an angularly disposed guard 63 is also carried by the bar 58 and arranged to overlie the pulley. The cable 57 is entrained over the pulley 62 and beneath the guard member 63 so as to guide the cable 57 while it is being wound upon or payed off of the spool segment 55 of the winch 53.

The plate 30 has mounted on the upper surface thereof adjacent its rear edge a pulley 65 which is partially disposed within a housing or guide member 66. The spool segment 54 has a cable 67 wound thereon in a clockwise direction with one end of said cable being fed beneath the bar 58 adjacent the spacing block 60 and entrained about the pulley 65 and then fed over the bar 58 adjacent the guard 63 and secured, in any suitable manner, to the tube 40 that is secured to and carried by the forward end of the stringers 39. The platform or bed 46 has pivotally mounted on the rear end thereof a conventional tailgate 69, which gate is spring biased to a normally downwardly projecting position as shown in FIG. 2.

In the use or operation of the platform 46, it can be assumed that said platform is positioned upon the frame members 21 as shown in FIGS. 1 and 2, wherein the channel members 38 are supported upon the trackways 34 and upon the plate or member 30 within the guideways 36 with the rollers 28 projecting through the openings 51 in the plate 30 and the apertures 51 and the rollers 49 engaging the locking members 50 on the frame members 21 for retaining said platform upon said frame members. Upon the application of power to the winch 53, the segment 55 will start to pay out the cable 57, while cable 67 will be wound upon segment 54, which action will cause the rollers 49 to be withdrawn from the locking members 50 and moved up onto the trackways 34; and, at the same time, the channel members 38 will be moved rearwardly and up onto the rollers 28. The continued winding of the cable 67 upon the spool segment 54 will cause the platform 46 to be moved rearwardly along the trackways 34 and guideways 36 on plate 30 until the center of gravity of the platform moves past the shaft 29 at which time the plate 30 and segments 31 will pivot about said shaft 29.

Figure 3:
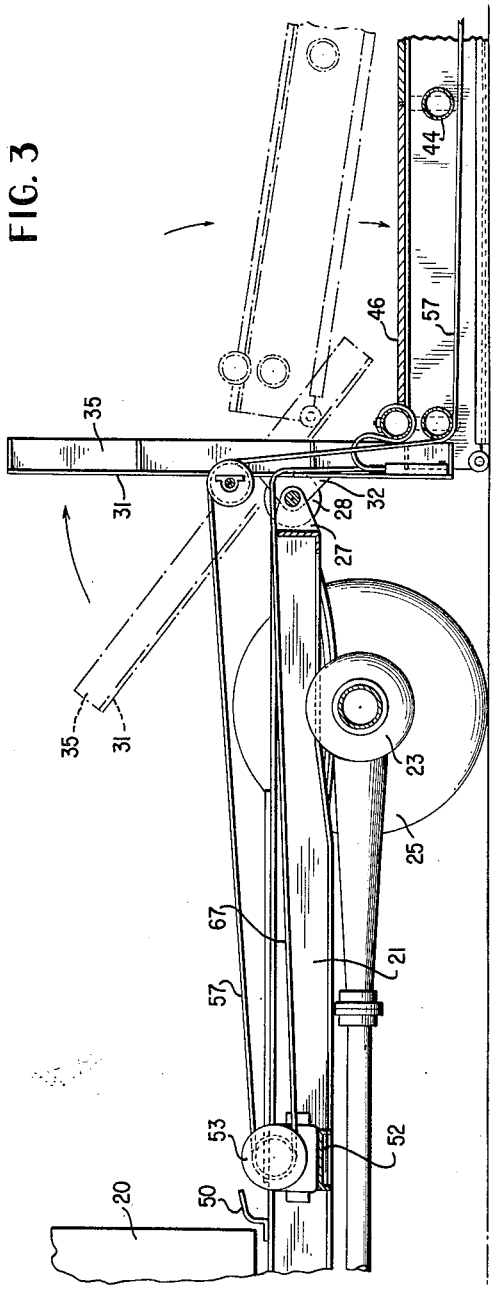
FIG. 3 is a vertical sectional view of the bed or platform shown in FIG. 2 and illustrating the position of the bed or platform when it is lowered to a ground-supporting position for loading and unloading.

The pivoting of the plate 30 about shaft 29 will cause the rear end of the platform 46 to move downwardly into a ground-engaging position so that the tail gate 69 will overcome the action of the spring upon being raised manually and assume a horizontal position or a position which is a continuation of the bed 46. During the aforementioned operation, the vehicle truck having been placed in neutral gear and the brakes being left off will, upon the rear end of the platform 46 striking the ground, start to move forward or out from under the platform. The continued winding of the cable 67 upon the spool segment 54 will cause the truck to continue its forward movement until such time as the plate 30 has pivoted about shaft 29 to assume a substantially vertical position with respect to the frame members 21, FIG. 3. With the plate 30 in substantially a vertical position, the forward end of the platform 46 will move over the surface of the plate until said forward end is deposited on the ground, FIG. 3. When the platform 46 is so positioned upon the ground, it may then be loaded with any suitable material or equipment, such as a bulldozer or the like, which may be driven onto said platform from the rear end or from either side thereof. After the platform 46 has been loaded, the material or objects thereon suitably anchored to the platform by chains, chocks or the like, then the rotation of the winch 53 is reversed so that the cable 57 will now be wound upon the spool segment 55 and at the same time the cable 67 will be payed out from the spool segment 54.

As the cable 57 is wound upon the spool segment 55, the transverse tube 40 at the forward end of the platform 46 will be elevated and the rollers 49 will move along the guideways 36 on the plate 30. As the platform 46 is being elevated and moved along the guideways of the plate 30, the truck will be drawn rearwardly towards and beneath the platform due to the fact that the brakes of the truck have been left off and the truck is in neutral gear. As the truck is slowly and gradually moved rearwardly, due to the winching action, and the forward end of the platform 46 is moved over the plate 30, the weight of the load on the platform 46 will cause the plate 30 in conjunction with the platform to pivot about the shaft 29 so that the platform and plate will move up onto the frame members 21. The continued rotation of the winch 53 will move the platform along the guideways 36 over the trackways 34 until such time as the rollers 28 extend through the apertures 53 in the channel members 38, at which time the rollers 49 at the forward end of the stringers 39 will have moved off of the trackways 34 and onto the frame members 21 and into engagement with the locking members 50. When the platform 46 has reached the end of its travel on the trackways 34 and channel guideways 36 on plate 30, the cables 57 and 67 will be properly positioned with respect to the spool segments 54 and 55 and the spring-biased tail gate 69 will be in a depending position so that the truck with its load thereon is ready for movement from one area to another.

In FIGS. 9 through 12, there is shown a modified form of the platform mounted upon a truck frame and embodying the present invention. The platform and truck shown in FIGS. 9 through 12 is identical with that shown in FIGS. 1 through 8 with the exception of the means for moving the platform off of and onto the truck frame members. Where the parts, such as plates, channel members, stringers, tension bars and the like are identical, they have been so indicated by the same reference numerals of a higher series. The plate or member 130 has mounted on the forward end thereof, in any suitable manner, a pair of double-acting hydraulic cylinders 175 which have extending from the rear ends thereof piston rods 176 that project beyond the rear edge of the plate 131. The ends of the piston rods 176 are connected to a cross shaft 177 which has rotatably mounted on each end thereof a pair of pulleys or sheaves 178 and 179 that are retained in spaced relation with one another on said shaft.

The plate or member 130, FIG. 11, has secured thereto, adjacent the rear edge thereof, a pair of arms or rods 181 which project rearwardly of said plate and are connected at their free ends to a transverse bar or member 182 so that said arms and bar are in effect an extension or continuation of plate or member 130. The ends of the bar 182 have connected thereto and depending therefrom guides 183 which project outwardly a sufficient distance to engage the bottom surface of the channel members 138 and to provide a surface over which said channel members are adapted to move and also to act as counterweights and prevent the weight of the two cylinders 175 from overbalancing the plate or member 130. The plate 130 has mounted on its upper surface adjacent the rear end of the cylinder 175 beneath the piston rods 176 pulleys or sheaves 184 so that a cable 185 having one end secured to a brace 144, near the front end of the platform 146, is fed over the pulley 179, on one end of the cross shaft 177 and then passed about the pair of sheaves 184 and then entrained over the pulley 179 mounted on the other end of cross shaft 177 and finally secured to said brace 144. The pulleys 178 mounted on the ends of shaft 177 each have a cable 187 entrained thereover with one end of each of said cables being secured to the bar 182 and the other ends secured to a brace 144 near the rear end of the platform 146.

The angle brackets 142 along each side edge of the platform 146 have secured thereto adjacent the tubes 140 and 141 a truss rod 188. The angle brackets 142 and truss rods 188 have interposed therebetween vertical braces 189 which are fastened by any suitable means to said rods and brackets in approximately the central portion of said platform 146. Thus, the bed or platform 146 is materially strengthened by the truss arrangement, as disclosed through the use of the tubular braces 143, braces 144 and tension bars 145 as well as the angle brackets 142 and truss rods 188 with braces 189, whereby the outer edge portions of the platform 146 are capable of carrying considerable weight such as the wheels of a tractor or bulldozer.

In the operation of the platform as shown in FIGURES 9 through 12, hydraulic fluid is delivered from a suitable supply source on the truck, not shown, to the cylinders 175 through the connections 190 to either advance or retract the piston rods 176 and in turn the cross shaft 177 and pulleys 178 and 179 with respect to plate 130. If the platform 146 is positioned upon the truck and is to be loaded or unloaded, the delivery of fluid to the forward end of the cylinders 175 will result in the piston rods 176 and cross shaft 177 being advanced so that the cable 185 will cause the platform to be moved along the frame members 121 and as the center of gravity of the platform 146 moves beyond the shaft 129, the plate 130 and platform 146 will pivot about said shaft permitting the rear end portion of the platform to engage the ground. Due to the fact that the truck is in neutral gear and the brakes are in the off position the truck will move forward or out from beneath the platform until the piston rods 176 have reached the end of their travel at which time the forward end of the platform will be supported upon the plate 130 adjacent the rear end of the frame members 121. In this modified form of the invention, the platform 146 is disposed in an inclined plane with one end engaging the ground and the other supported by the rear end of the frame members 121 so that equipment may be driven up onto the platform in its inclined position and secured thereon by suitable means. The platform 146 is then drawn back over the plate 130 and onto the frame members 121 by the hydraulic cylinders 175 in much the same manner as the platform 46.

Figure 13:
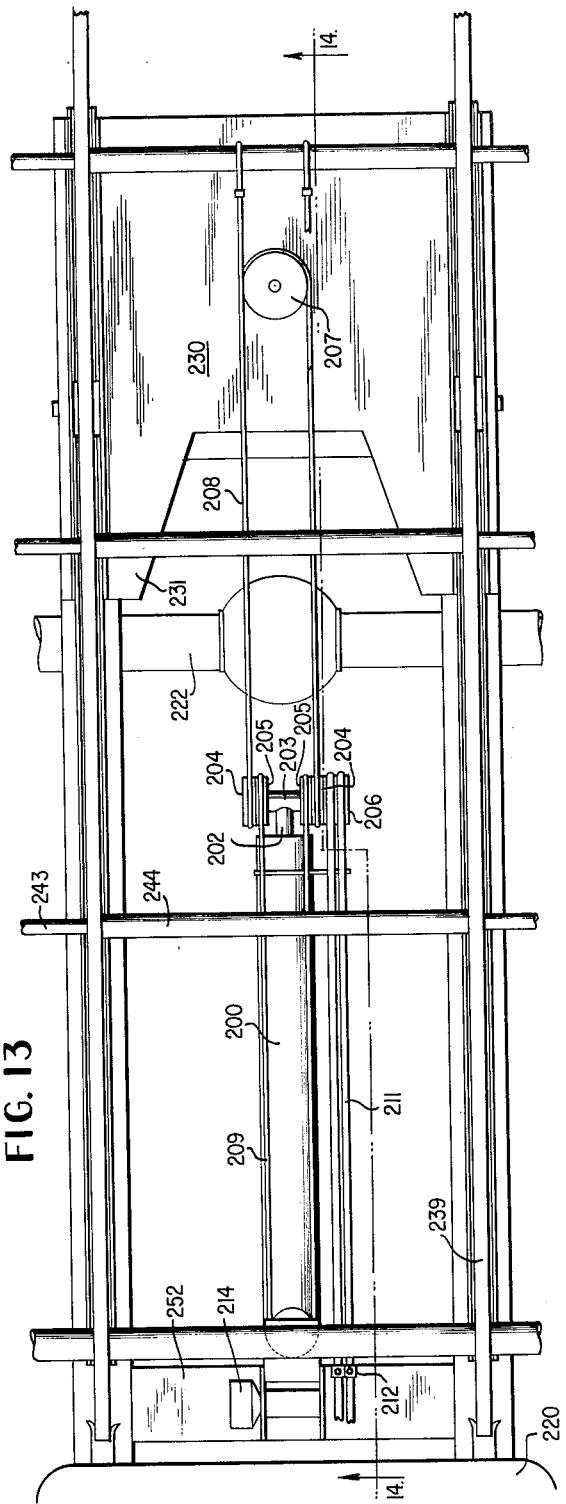
FIG. 13 is a top plan view of another modification of the mobile bed or platform of the present invention with certain portions of the platform being omitted in the interest of clarity.
Figure 14:
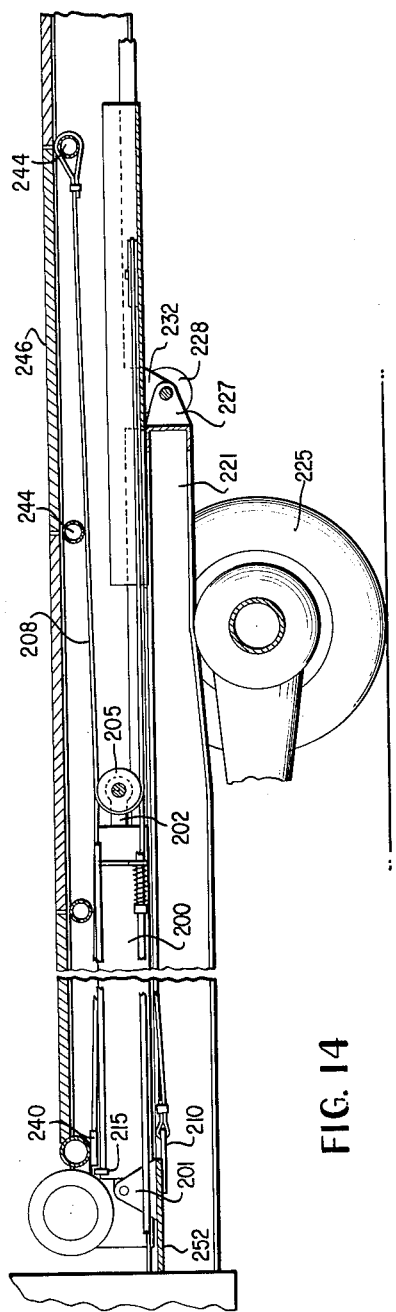
FIG. 14 is a longitudinal vertical sectional view of the modified truck and platform with planking, the view being taken on the plane 14—14 of FIG. 13.

There is shown in FIGS. 13 and 14 still another modified form of the platform or bed of the present invention, and said platform and truck are in many respects identical with that shown in FIGS. 1 through 8. Where the parts in FIGS. 13 and 14 are identical with those in FIGS. 1 through 8 and 9 through 12, they have been so indicated by the same reference numerals of a series higher than those in FIGS. 9 through 12. The hydraulic cylinder 200 is connected at its forward end to a bracket support 201 that is secured to the plate 252 adjacent the cab 220. The hydraulic cylinder 200 has a piston rod 202 extending therefrom which carries at its outer end a transversely extending shaft 203 upon which pulleys 204 and 205 are rotatably mounted at each end thereof. In addition, one end of said shaft 203 has a pair of pulleys 206 mounted thereon.

The plate or member 230 has a sheave 207 mounted on the upper surface thereof so that a cable 208 having one end secured to a brace 244 adjacent the rear end of the platform 246 is entrained first about pulley 204 on one end of shaft 203 and then around sheave 207 and then about the other pulley 204 and then back to brace 244. A second cable 209 is secured at its ends to the truck frame by a bracket 210, FIG. 14, and is then entrained about the pulleys 205 on shaft 203 and then fastened to the platform 246 adjacent the tube 240. A fluid conduit or hose 211 is disposed in the same horizontal plane as cable 209 and is entrained about pulleys 206 with end 212 of said hose having a suitable connection, not shown, to a conventional hydraulic winch 214 mounted on support 252 adjacent the cab 220. The other end 215 of the hose 211 is connected to a suitable control valve, not shown, which in turn is connected to the cylinder 200 for controlling the movement of the piston and piston rod. Thus, when the piston rod 202 is extended the platform 246 through the action of said piston rod and cable 209 will be moved rearwardly of the frame members 221 until the platform 246 engages the ground in the same manner and position as set forth hereinabove with respect to platform 146 disclosed in FIGS. 9 through 12. As the piston rod 202 and cross shaft 203 are extended or retracted with respect to the cylinder 200, the fluid conduit 211 will be maintained under proper tension for delivering fluid during such movement.

Although the foregoing description is necessarily of a detailed character, in order that the invention may be completely set forth, it is to be understood that the specific terminology is not intended to be restrictive or confining, and that various rearrangements of the parts and modification of detail may be resorted to without departing from the scope or spirit of the invention as herein claimed.

I claim:

1. A load-conveying vehicle comprising a pair of elongated frame members having a rear end mounted upon ground engaging wheels, a plate pivotally connected to rear end of the frame members with one portion of the plate projecting beyond the rear end of said frame members and another portion arranged to overlie part of said frame members, said plate being movable from a horizontal position on said frame members to a substantially vertically position at the end of said frame members; a platform slidably mounted on said plate and frame members for movement from a position upon said plate and frame members to a position upon the ground rearwardly of said vehicle, means carried by said frame members and engageable with said platform for securing the platform upon said plate and frame members, a plurality of pulleys carried by said plate, a winch mounted upon said frame members, said winch being formed with spool segments with a cable mounted upon each segment, one of said cables being entrained about one of the pulleys on said plate and fastened to the forward end of said platform, the other of said cables being entrained over another of the pulleys and fastened to the rear end of the platform, and means to actuate said winch to reel in the cable entrained about said pulley and fastened to the forward end of said platform and pay out the cable entrained over said pulley and fastened to the rear end of the platform to move said platform along said frame members and over said plate to cause said plate and platform to pivot about the rear end of said frame members and deposit the rear end of said platform upon the ground, and continued actuation of said winch will cause said plate to move into a substantially vertical position and the forward end of said platform to slide over said plate and be deposited upon the ground rearwardly of said vehicle.

2. A load-conveying vehicle as defined in claim 1 wherein said plate is formed with a bifurcated end, the segments of which overlie a portion of each of said frame members and define a guideway for said cables with means connected to and carried by said segments for supporting at least one of the pulleys on said plate.

3. A load-conveying vehicle as defined in claim 2 wherein said platform comprises spaced elongated channel members slidably mounted on said frame members and plate and having upright supports affixed to said channel members for receiving planking members thereto.

4. A load-conveying vehicle as defined in claim 3 wherein said platform comprises brackets connected to said supports in spaced relation to receive and support the ends of said planking members with braces interposed between said supports.

5. A load-conveying vehicle comprising a pair of elongated frame members mounted upon ground-engaging wheels, an apertured plate pivotally supported upon an end of said frame members and arranged to overlie a portion of said frame members, a pair of rollers carried by said frame members and arranged to project through the apertures of said plate, a pair of spaced channel members supported on said plate and frame members, supports carried by said channel members and means positioned on said supports and defining with said channel members and supports a platform, power means carried by said frame members, said power means having cables connected thereto and to the front and rear end portions of said platform, means for actuating said power means for moving said platform over said rollers and along said frame members and plate by means of the cable connected to the front portion of said platform to pivot said plate and platform about said frame members and move said platform into a ground-engaging load-receiving position.

6. A load-conveying vehicle as defined in claim 5 wherein said platform comprises braces interposed between and connected to said supports, angle brackets connected to said supports and arranged in spaced parallel relation thereto, braces connected to said supports and brackets, tension bars extending across and connected to said supports and brackets and planking supported upon said supports and angle brackets intermediate adjacent tension bars.

7. A load-conveying vehicle comprising a pair of elongated frame members mounted upon ground-engaging wheels at their forward and rear ends with an engine and driver's cab supported upon the forward end of said members, a plate pivotally supported upon the rear ends of said frame members, said plate having a bifurcated portion arranged to overlie a portion of said frame members, trackways affixed to said frame members between said bifurcated portion and the driver's cab, a platform mounted upon said frame members, said platform comprising spaced channel members slidably positioned upon said plate and trackways, rollers secured to the forward end of said platform and engaging said trackways and plate, a pair of spaced rollers carried on the pivotal connection of said plate and frame members, said plate having openings therein overlying said spaced rollers through which a portion of said spaced rollers project, said channel members engaging said spaced rollers to facilitate the movement of said platform over said trackways and plate, power means supported on said frame members, cables connected to said power means and to the front and rear end portions of said platform, means for actuating said power means to move said platform and said channel members by means of the cable connected to the front portion of said platform over said trackways and plate while supported on said rollers and spaced rollers into a ground-engaging load-receiving position, said power means being capable of moving said platform and load thereon onto said frame members by means of the cable connected to the rear end portion of said platform.

8. A load-conveying vehicle comprising a pair of elongated frame members mounted upon ground-engaging wheels at their forward and rear ends with an engine and driver's cab supported upon the forward end of said members, a plate supported upon said frame members and pivotally connected to the rear ends thereof, said plate having a bifurcated portion arranged to overlie a portion of said frame members, trackways affixed to said frame members between said bifurcated portion and the driver's cab, a platform mounted upon said frame members, said platform comprising spaced channel members slidably positioned upon said plate and trackways, rollers secured to the forward end of said platform and engaging said trackways and plate, a pair of spaced rollers carried on the pivotal connection of said plate and frame members, said plate having openings therein overlying said spaced rollers through which a portion of said spaced rollers project, said channel members engaging said spaced rollers to facilitate the movement of said platform over said trackways and plate, and power means supported on said frame members and engageable with said platform for moving said channel members over said trackways and plate while supported on said rollers and spaced rollers into a ground-engaging load-receiving position, said power means being capable of moving said platform and load thereon onto said frame members, and a tail gate pivotally connected to said platform and being spring biased into a position normal to the plane of said platform.

9. A load-conveying vehicle comprising a pair of elongated frame members mounted upon ground-engaging wheels at their forward and rear ends with an engine and driver's cab supported upon the forward end of said members, a plate supported upon said frame members and pivotally connected to the rear ends thereof, said plate having a bifurcated portion arranged to overlie a portion of said frame members, trackways affixed to said frame members between said bifurcated portion and the driver's cab, a platform mounted upon said frame members, said platform comprising spaced channel members slidably positioned upon said plate and trackways, rollers secured to the forward end of said platform and engaging said trackways and plate, a pair of spaced rollers carried on the pivotal connection of said plate and frame members, said plate having openings therein overlying said spaced rollers through which a portion of said spaced rollers project, said channel members engaging said spaced rollers to facilitate the movement of said platform over said trackways and plate, said channel members having spaced openings for receiving said spaced rollers and said frame members having locking members engageable with said rollers for holding said platform upon said plate and trackways, and power means supported on said frame members and engageable with the forward end portion of said platform for moving said channel members over said trackways and plate while supported on said rollers and spaced rollers to cause said plate to pivot about the rear end of said frame members while guiding said platform into a ground-engaging, load-receiving position, said power means engageable with the rear end portion of said platform for moving said platform and load from said ground engaging position back over said plate and onto said frame members.

10. A load-conveying vehicle as defined in claim 9 wherein said power means comprises a reversible winch having spool segments with a cable wound in a clockwise manner on one segment and connected to one end of said platform and a second cable wound in a counterclockwise manner on another segment and connected to the other end of said platform and cable guide means carried by the bifurcated portion of said plate.

References Cited in the file of this patent

UNITED STATES PATENTS

| | | |
|---|---|---|
| 2,021,952 | Wren | Nov. 26, 1935 |
| 2,508,740 | Alvare | May 23, 1950 |
| 2,534,156 | Wyatt et al. | Dec. 12, 1950 |
| 2,580,501 | Anderson et al. | Jan. 1, 1952 |
| 2,834,492 | Roy et al. | May 13, 1958 |
| 2,867,339 | Nelson | Jan. 6, 1959 |

FOREIGN PATENTS

| | | |
|---|---|---|
| 463,907 | Great Britain | Apr. 8, 1937 |